(12) United States Patent
Goel et al.

(10) Patent No.: US 8,325,795 B1
(45) Date of Patent: Dec. 4, 2012

(54) MANAGING INDEXING OF LIVE MULTIMEDIA STREAMING

(75) Inventors: Neeraj Goel, Delhi (IN); Mohit Srivastava, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1037 days.

(21) Appl. No.: 12/325,969

(22) Filed: Dec. 1, 2008

(51) Int. Cl.
*H04N 7/12* (2006.01)

(52) U.S. Cl. ............... 375/240.01; 375/240.02

(58) Field of Classification Search ............. 375/240.01, 375/240.02
See application file for complete search history.

(56) References Cited

U.S. PATENT DOCUMENTS

| | | | |
|---|---|---|---|
| 4,322,795 A | | 3/1982 | Lange et al. |
| 5,592,667 A | * | 1/1997 | Bugajski ............................... 1/1 |
| 5,606,688 A | | 2/1997 | McNutt et al. |
| 6,671,766 B1 | | 12/2003 | Vandenbergh et al. |
| 6,678,793 B1 | | 1/2004 | Doyle |
| 6,721,490 B1 | * | 4/2004 | Yao et al. ....................... 386/351 |
| 6,782,412 B2 | * | 8/2004 | Brophy et al. ................. 709/204 |
| 6,826,585 B2 | * | 11/2004 | Mitsunaga et al. ........... 708/446 |
| 6,989,953 B1 | * | 1/2006 | Codilian ..................... 360/73.03 |
| 7,051,163 B2 | * | 5/2006 | Van Doren et al. ........... 711/141 |
| 7,174,440 B2 | | 2/2007 | Chang et al. |
| 7,246,369 B1 | | 7/2007 | Duan et al. |
| 7,324,555 B1 | | 1/2008 | Chen et al. |
| 7,552,223 B1 | | 6/2009 | Ackaouy et al. |
| 7,617,362 B2 | | 11/2009 | Craft et al. |
| 7,752,386 B1 | | 7/2010 | Aral et al. |
| 2002/0065899 A1 | | 5/2002 | Smith et al. |
| 2002/0069420 A1 | | 6/2002 | Russell et al. |
| 2002/0077789 A1 | * | 6/2002 | Mitsunaga et al. ........... 702/196 |
| 2002/0122607 A1 | * | 9/2002 | Sakai et al. .................... 382/305 |
| 2002/0152361 A1 | | 10/2002 | Dean et al. |
| 2005/0060496 A1 | | 3/2005 | Krissell et al. |
| 2005/0283567 A1 | * | 12/2005 | Popescu-Stanesti et al. . 711/106 |
| 2006/0200412 A1 | * | 9/2006 | Fahrny et al. .................... 705/50 |
| 2006/0279655 A1 | * | 12/2006 | Chen et al. ..................... 348/441 |
| 2009/0276572 A1 | | 11/2009 | Heil et al. |
| 2010/0070714 A1 | | 3/2010 | Hoover et al. |
| 2010/0128918 A1 | | 5/2010 | MacWan |
| 2010/0153802 A1 | | 6/2010 | Van der Merwe et al. |

OTHER PUBLICATIONS

Shalan et al, A dynamic memory management unit for embedded real-time system on a chip, 2000.*
International Standard; ISO/IEC 14496-12; Information Technology—Coding of Audio-Visual Objects, "Part 12: ISO Base Media File Format", Second Edition, Apr. 4, 2005.

(Continued)

*Primary Examiner* — Jung Kim
*Assistant Examiner* — Shan Elahi
(74) *Attorney, Agent, or Firm* — Fish & Richardson P.C.

(57) ABSTRACT

Generation of live streaming indices is disclosed that stores a media stream recording from a live event. Seek points are added to a fixed-length index memory corresponding to each point of the media stream separated at a first interval. In response to the fixed length being reached, alternate ones of the seek points are deleted up to a predefined percentage of the fixed length. Location indicators are added where the deletions caused the previous interval to be altered and at the end of the previous seek points remaining in the index memory. A new interval is then calculated, which corresponds to the altered interval, after which new seek points are added beginning at the second location indicator to the index memory corresponding to the points in the media stream separated by the new interval.

26 Claims, 8 Drawing Sheets

OTHER PUBLICATIONS

International Telecommunications Union; Telecommunication Standardization Sector of ITU, "Series H: Audiovisual and Multimedia Systems; Infrastructure of Audiovisual Services—Coding of Moving Video", Recommendation ITU-T H2.64, Mar. 2009.

Adobe Systems Inc., "Action Message Format—AMF 0", http://opensource.adobe.com/wiki/download/attachments/1114283/amf0_spec_121207.pdf, Oct. 10, 2009.

Tincan Video File Format, Sep. 14, 2009.

"Technical Note TN2224, Best Practices for Creating and Deploying HTTP Live Streaming Media for the iPhone and iPad," retrieved from the Internet on Apr. 23, 2010, http://developer.apple.com/iphone/library/technotes/tn2010/tn2224.html, 6 pages.

"HTTP Live Streaming Overview," Mar. 25, 2010, Apple Inc., 28 pages.

"HTTP Live Streaming draft-pantos-http-live-streaming-03," Apr. 2, 2010, R. Pantos, Ed., Apple Inc., http://www.iet.org/ietf/lid-abstracts.txt., 23 pages.

"Apple proposes HTTP streaming feature as IETF standard", Jul. 9, 2009, by Chris Foresman, Ars Technica, http://arstechnica.com/web/news/2009/07/apple-proposes-http-streaming-feature-as-a-protocol-standard.ars, 3 pages.

McCullough, Wesley, Disk Management, U.S. Appl. No. 12/336,706, filed Dec. 17, 2008, 25 pages, to be published by USPTO.

McCullough, Wesley, Storage Format for Media Streams, U.S. Appl. No. 12/610,251, filed Oct. 30, 2009, 35 pages, to be published by USPTO.

Streeter, Kevin, Data Framing, U.S. Appl. No. 12/768,636, filed Apr. 27, 2010, to be published by USPTO, 55 pages.

\* cited by examiner

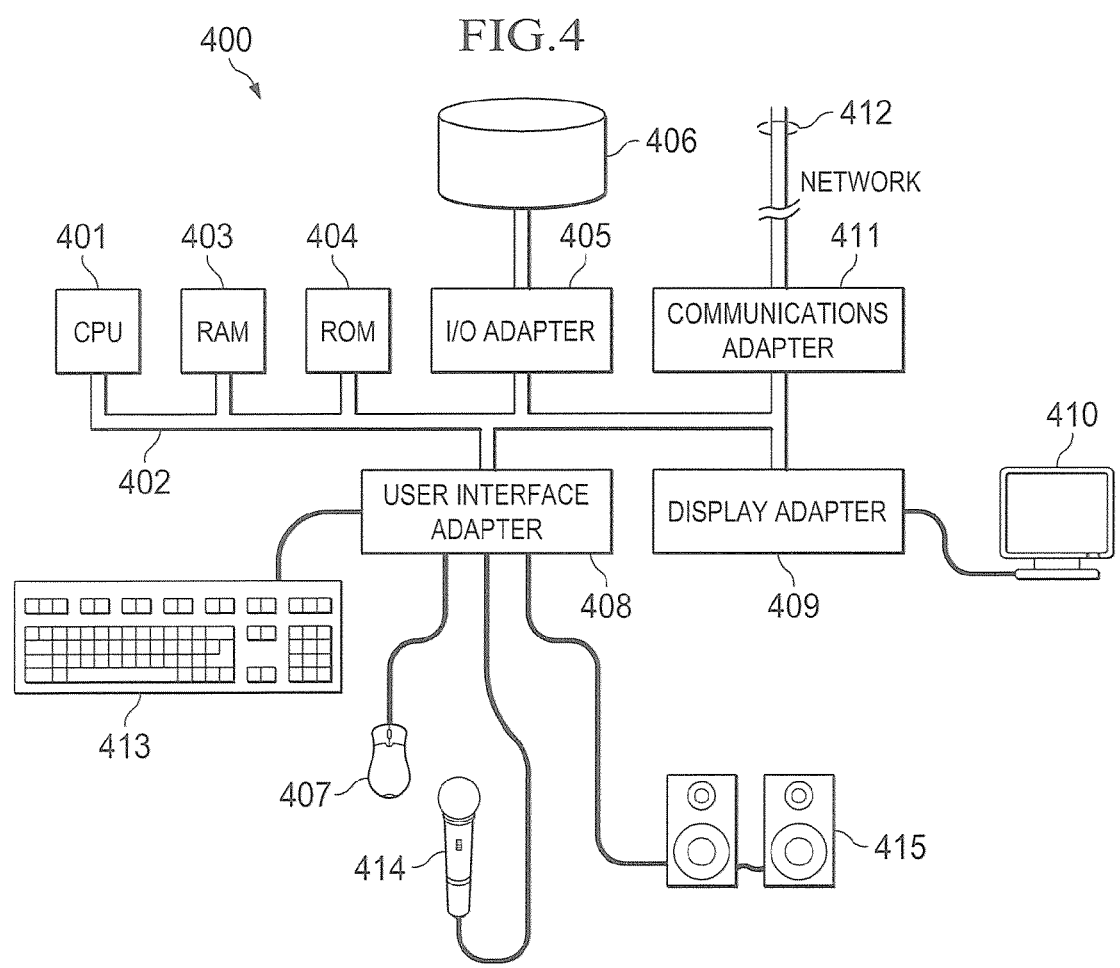

MANAGING INDEXING OF LIVE MULTIMEDIA STREAMING

TECHNICAL FIELD

The present disclosure relates, in general, to streaming media, and, more particularly, to managing indexing of live multimedia streaming.

BACKGROUND

As networking technology and bandwidth capabilities have increased, the delivery of richer multimedia resources has also increased and improved in quality and accessibility. Instead of completely downloading an audio or video file to a user's computer to view or listen to the entire file on the user's computer, streaming media allows users to request delivery of the media stream from the remote location in which the user may begin viewing or listening to the file before the entire file has been downloaded to the user's computer. In fact, some streaming multimedia only stores what is immediately playing to the user, including any buffered amount in order to maintain quality of service, and then deletes the data as it plays. Thus, the flexibility of viewing or listening to this rich information has been increased.

For smaller length files, it is reasonable to allow users to view or listen to the file from beginning to end in order to find the information within the file. However, there may be some accessible audio or video which is hours in length or even days in length. Expecting a user to wait for hours or days in order to reach a particular portion of this file is unreasonable. Therefore, in order to provide a more efficient means for accessing various points of time in these multimedia files, seek points are generated for the multimedia file and placed into an index of the file. As the file is played for the user, the media player rendering the audio or video of the file generally uses this index to provide visible seek point that the user can select in order to jump to various points in time within the file or may use in a "stepped" fast forward operation that can skip through the file at steps equal to the time interval between the seek points. This ability to seek to a particular point or skip through the file at a defined interval allows the user to get to the desired information in the file without the necessity of waiting for the file to play out to that point.

Depending on the total size of the multimedia file, the seek points will be placed at regular intervals designed to provide the appropriate granularity across the entire file. Having an appropriate granularity assists the user to efficiently seek for various points within the total file. For example, stepping through a 10-hour long multimedia file at 3 second intervals would do little more than merely waiting for the file to run at its normal play time. Instead, placing seek points at 10, 15, or even 30 second intervals would allow the user to more efficiently seek through the file.

Typically, in order to create indices of streaming multimedia files, the entire length of the file is known. Therefore, an efficient seek point interval may be determined and saved into the index for the multimedia file. However, there are certain situations in which it is desired to create the index at the time of recording the media stream itself. In these situations, the total length of the file is unknown, thus, determining, at the beginning of the recording, an efficient seek point interval would be nearly impossible and very impractical. To accommodate this uncertainty, a seek point entry is made in the index at some fixed, predetermined interval.

Another difficulty in generating an index at the time of recording arises because of the operational elements of indices. In order to enable random access points, i.e., seek points, those seek points need to be available to the file reader/player when the file reader/player begins playing the media file. This implies that the seek points/indices are stored at a single location in the multimedia file. Therefore, when creating the index during the recording of a live event, the seek points are typically stored in memory until the recording is finished after which the seek points/index are written to disk. This process creates a very large memory overhead for every recording session as the seek points/indices are stored in memory until the recording stops. Products now exist, such as Adobe Systems Incorporated's FLASH® MEDIA SERVER and FLASH® MEDIA LIVE ENCODER, that support recording video that might run for days or even weeks at a time. Thus, the memory overhead for such products would be prohibitive.

Moreover, the longer the recording continues, the granularity of the seek points becomes too fine to be of any use to the ultimate user. For example, if the fixed interval that is set for the seek points when the recording begins is 3 seconds, this interval remains efficient until the recording begins to reach around 3 hours. If the resulting file length ends up at 24 hours, this preset interval time offers little in improved efficiency to the ultimate user.

BRIEF SUMMARY

The embodiments presented in this disclosure are directed to building an index of seek points while storing the multimedia file recorded from a live event. Instead of setting a static seek point interval with an unlimited index file in memory, the present teachings disclose a static, fixed-length index file with a dynamic interval level and a dynamic seek point count. An initial interval is set which causes seek points to be added to the index file. If the recording lasts long enough for the index file to fill all of its capacity, alternate ones of the seek points are deleted beginning at the first address of the index memory, a new interval is calculated to account for the larger expected time frame of the multimedia file, and the identified location in the media file or of the live event is stored. New seek points are then added to the index memory using the new interval beginning from the index entry associated with the identified location.

Representative embodiments of the present teaching are directed methods that include creating an index memory having a predetermined capacity, wherein the index memory is configured to store an index under construction for a live event of unknown length. The methods further include inserting a plurality of seek points into the index memory, wherein the plurality of seek points are inserted at a first interval. Each of the seek points corresponds to a point in time of a media stream representative of the live event. The methods further include, responsive to the predetermined capacity of the index memory being reached, deleting ones of the seek points at a predefined period beginning at a first memory slot in the index memory, wherein these seek points are deleted up to a predefined percentage of the predetermined capacity, storing a first location point identifying a first position in the index memory corresponding to a final seek point of the plurality of seek points having a modified interval modified by the deleting, and storing a second location point identifying a second position in the index memory corresponding to a final seek point entry of the plurality of seek points still having the first interval. The methods also include calculating a new interval based at least in part on the first interval, wherein, responsive to the calculating, the plurality of seek points will start being inserted at the new interval beginning at the second location point.

Additional representative embodiments of the present teaching are directed to systems that include memory coupled to a processor and an indexing application stored in the memory. When executed by the processor, the indexing application includes an indexing component configured to add a plurality of seek points at a first interval to a predefined length index memory wherein each of the plurality of seek points corresponds to a time point of a live media stream of unknown length. The indexing application further includes a memory management component configured to monitor a current capacity of the predefined length index memory and further configured to delete, when the predefined length index memory is full, a portion of the plurality of seek points from a beginning of the predefined length index memory up to a fixed percentage of a total capacity of the predefined length index memory, to store a first location identifying an ending point of the plurality of seek points that have a modified interval length modified by the deleted portion, and to store a second location identifying a last entry in the predefined length index memory still having the first interval. The indexing application also includes an interval component configured to calculate a new interval based at least in part on the first interval, wherein the indexing component is further configured to continue adding the plurality of seek points to the predefined length index memory at the new interval.

Still further representative embodiments of the present teachings are directed to computer program products having computer readable media with computer program logic stored thereon. The computer program products include code for creating an index memory having a predetermined capacity, wherein the index memory is configured to store an index under construction for a live event of unknown length, code for inserting a plurality of seek points into the index memory, each of the seek points corresponding to a point in time of a media stream representative of the live event, wherein those seek points are inserted at a first interval. The computer program products also execute, in response to the predetermined capacity of the index memory being reached, code for deleting ones of the plurality of seek points at a predefined period beginning at a first memory slot in the index memory, wherein the seek points are deleted up to a predefined percentage of the predetermined capacity, code for storing a first location point identifying a first position in the index memory corresponding to a final seek point of the plurality seek points having a modified interval modified by results of execution of the code for deleting, and code for storing a second location point identifying a second position in the index memory corresponding to a final seek point entry of the plurality of seek points still having the first interval. The computer program products also include code for calculating a new interval based at least in part on the first interval, wherein, responsive to execution of the code for calculating, the code for inserting the seek points will start inserting seek points again at the new interval beginning at the second location point.

The foregoing has outlined rather broadly the features and technical advantages of the present teachings in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present teaching. It should also be realized by those skilled in the art that such equivalent constructions do not depart from the spirit and scope of the disclosure as set forth in the appended claims. The novel features which are believed to be characteristic of the teaching herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teaching.

BRIEF DESCRIPTION OF THE DRAWINGS

For a more complete understanding of the present teaching, reference is now made to the following descriptions taken in conjunction with the accompanying drawing, in which:

FIG. 4 illustrates an exemplary computer system 400 which may be employed to implement index generation for recording live streaming according to certain embodiments of the teachings disclosed herein.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art.

An algorithm is here, and generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like, refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Figure 1:
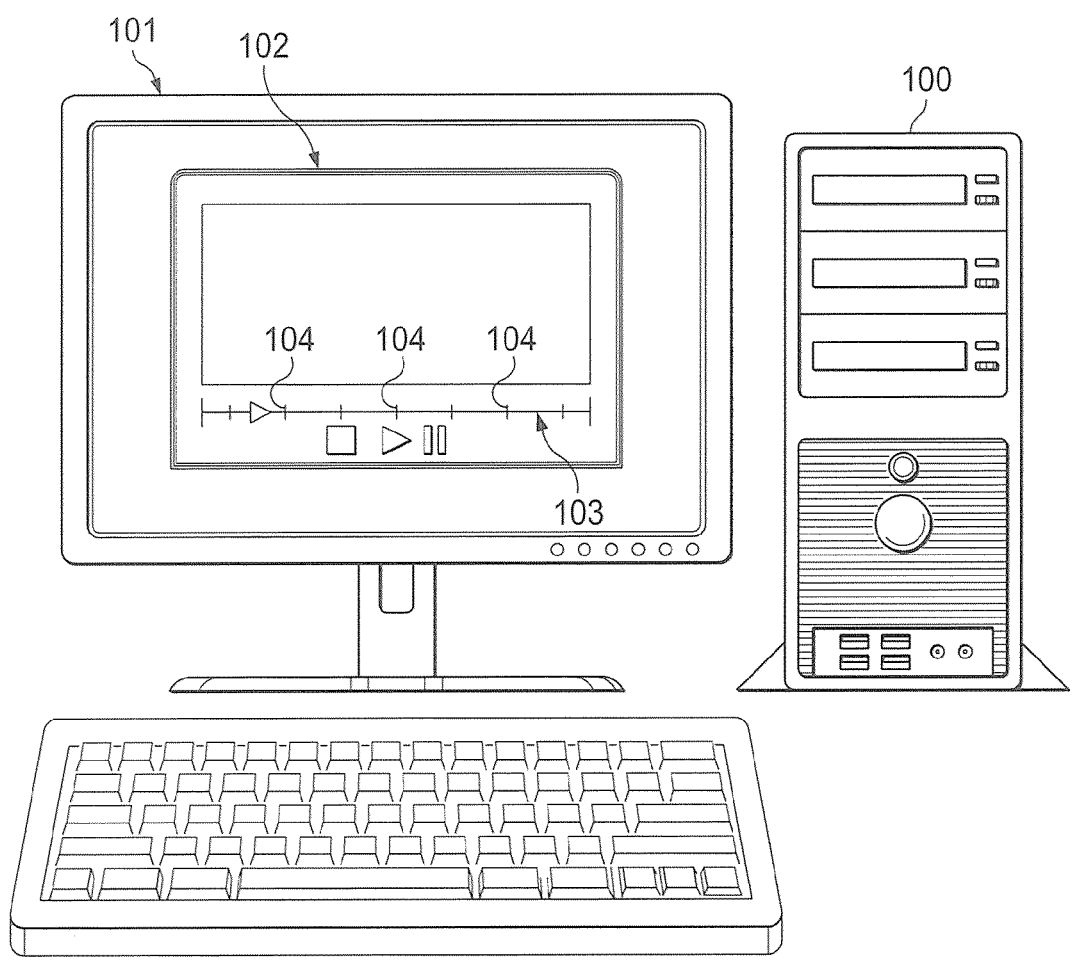
FIG. 1 is a diagram illustrating a computer operating a media player.

FIG. 1 is a diagram illustrating computer 100 operating media player 102. Media player 102 is displayed on monitor 101. The user at computer 100 starts and views video data through media player 102 and views the progression of the video data through timeline 103. Timeline 103 includes seek points 104 that divides the video data over a number of intervals. The user may randomly select one of seek points 104 to jump in the video data to that location represented by the selected seek point. Also, the user may step through the video data by sequentially moving from one of seek points 104 to the next one. Seek points 104 allow the user to efficiently move through the video data.

Figure 2A:
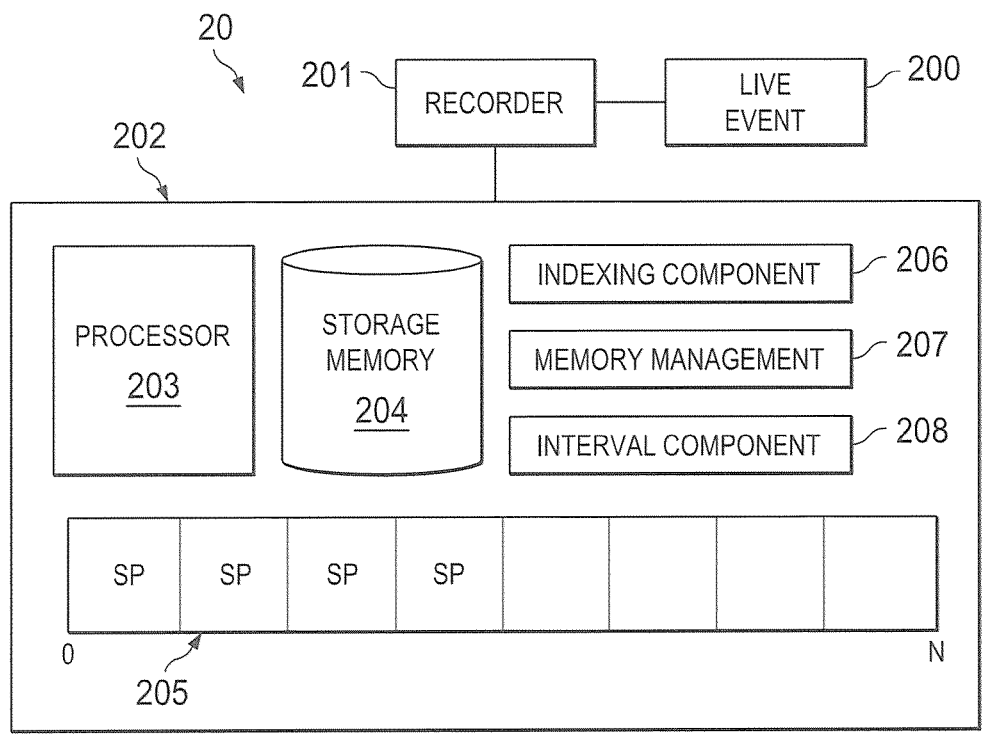
FIGS. 2A-2J are block diagrams illustrating an indexing system configured according to one embodiment of the present teachings.

FIGS. 2A-2J are block diagrams illustrating indexing system 20 configured according to one embodiment of the present teachings. Indexing system 20 operates on computer 202 which includes processor 203 and storage memory 204. Multimedia data is generated by recorder 201 recording live event 200. Live event 200 has an unknown length. The multimedia data is transmitted to computer 202, as shown in FIG. 2A, through some kind of media interface for processor 203 to control the process of storing the multimedia data onto storage memory 204 and generating the index for the resulting multimedia file. Processor 203 executes indexing component 206, memory management component 207, and interval component 208 as a part of executing the indexing application stored within computer 202. The index under construction is maintained in memory while the multimedia data is being recorded to storage memory 204. Index memory 205 is predetermined by indexing system 20 to be a fixed capacity, 0-N. The predetermined capacity of index memory 205 would be selected to produce an estimated number of seek points constituting a certain percentage of the size of any given multimedia file.

Figure 2B:
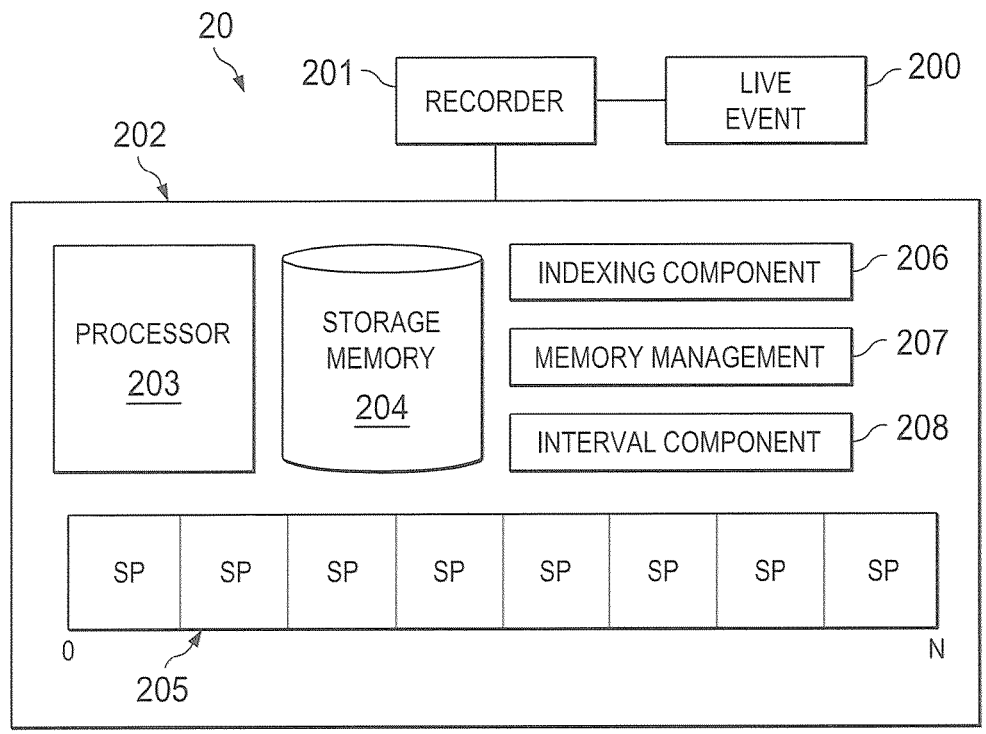
Figure 2C:
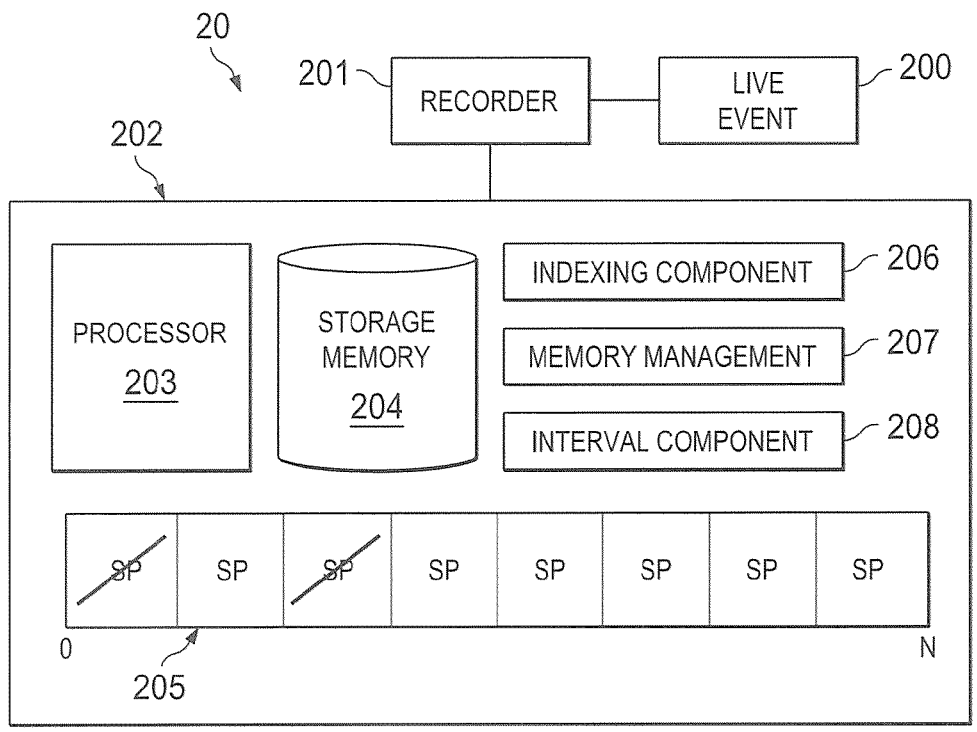

Indexing system 20 begins with indexing component 206 storing seek points (SP) in the memory locations of index memory 205 at a predefined initial interval. As illustrated in FIG. 2B, at a certain point in the duration of live event 200, index memory 205 reaches its predetermined capacity of stored seek points. When this predefined capacity is reached, indexing system 20 triggers memory management component 207 to go back to the first memory slot of index memory 205 and begins deleting seek point entries at a predefined period, such as alternate seek points as illustrated in FIG. 2C, until a predetermined percentage of seek point entries have been deleted from index memory 205. For purposes of this described example, indexing system 20 predetermines that alternate seek point entries will be deleted up to 25% of the total capacity of index memory 205. Interval component 208 calculates a new interval according to the formula:

$$\text{New Interval} = (2 \times (\text{Previous Interval} + 1)) \tag{1}$$

It should be noted that formula (I) is configured to arrive at seek point intervals that attempt to keep at least a minimum percentage of granularity. Percentage of granularity is the percentage of the interval length to the total time of the multimedia file. For example, a seek point interval of 3 seconds in a multimedia file that is 3 hours long results in a percentage of granularity of 0.0278%. Using formula (1), the new interval for a previous interval of 3 seconds would be 7 seconds. In order to maintain at least the percentage of granularity of 0.0278%, the total multimedia file time would need to be no more than 7 hours. Thus, the percentage of total deleted seek points is predetermined such that, after deleting the 25% capacity of seek points in index memory 205, index memory 205 will be re-filled when the multimedia file time is no longer than 7 hours.

It should further be noted that formula (1) is merely one possible formula for calculating a new interval period. Other formulas, such as New Interval=(2×Previous Interval), or the like, may be used in alternative and/or additional embodiments of the teachings herein, which maintain the desired percentage of granularity for any particular multimedia file.

Figure 2D:
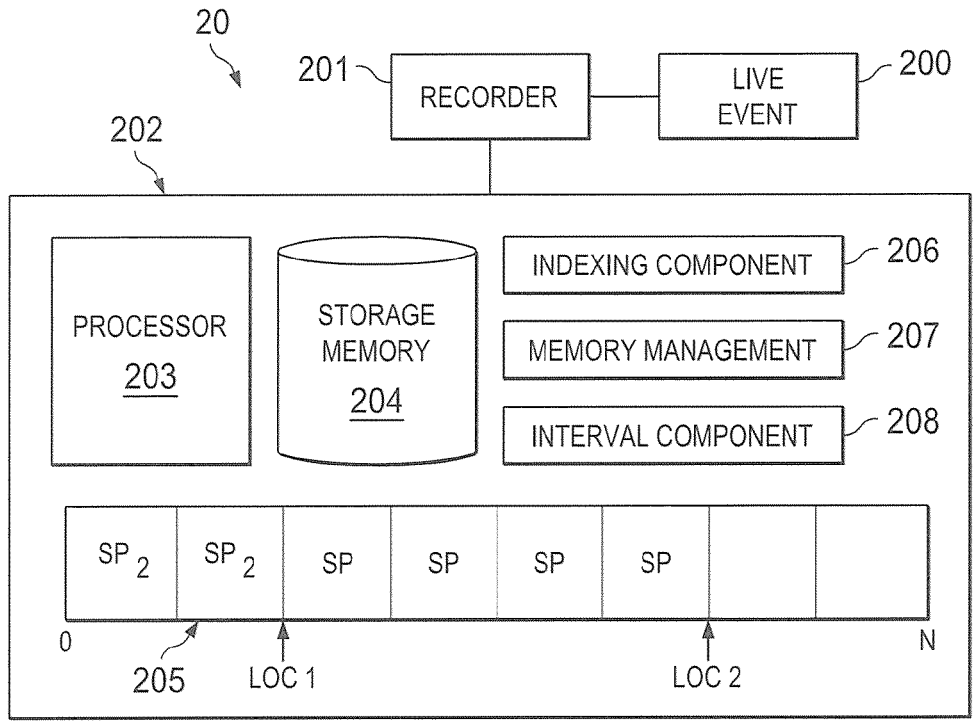
Figure 2E:
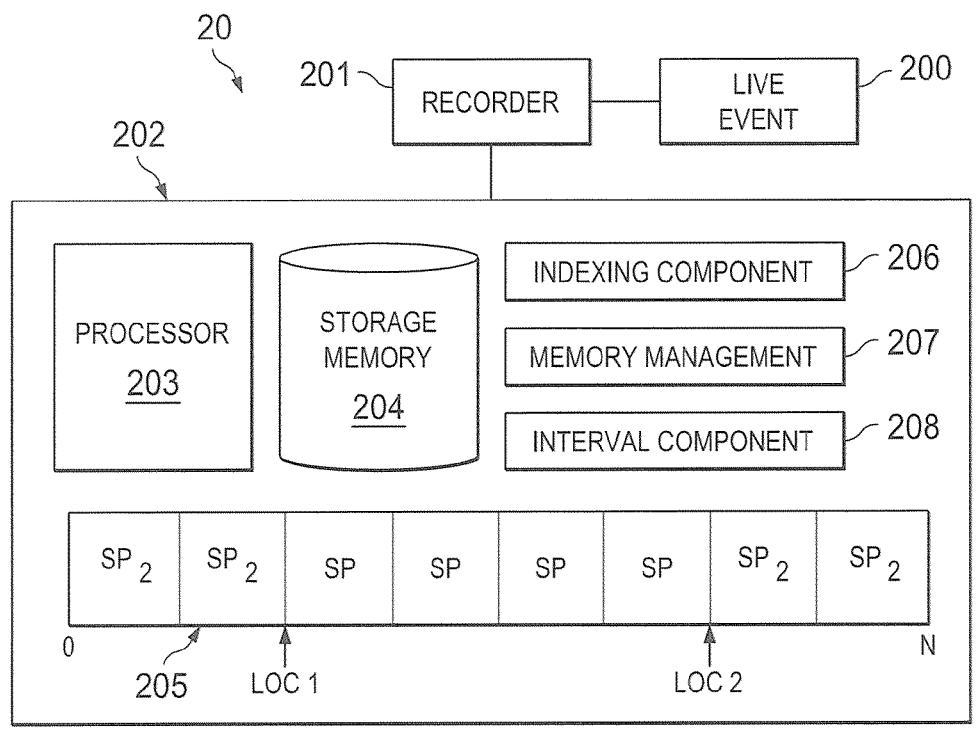
Figure 2F:
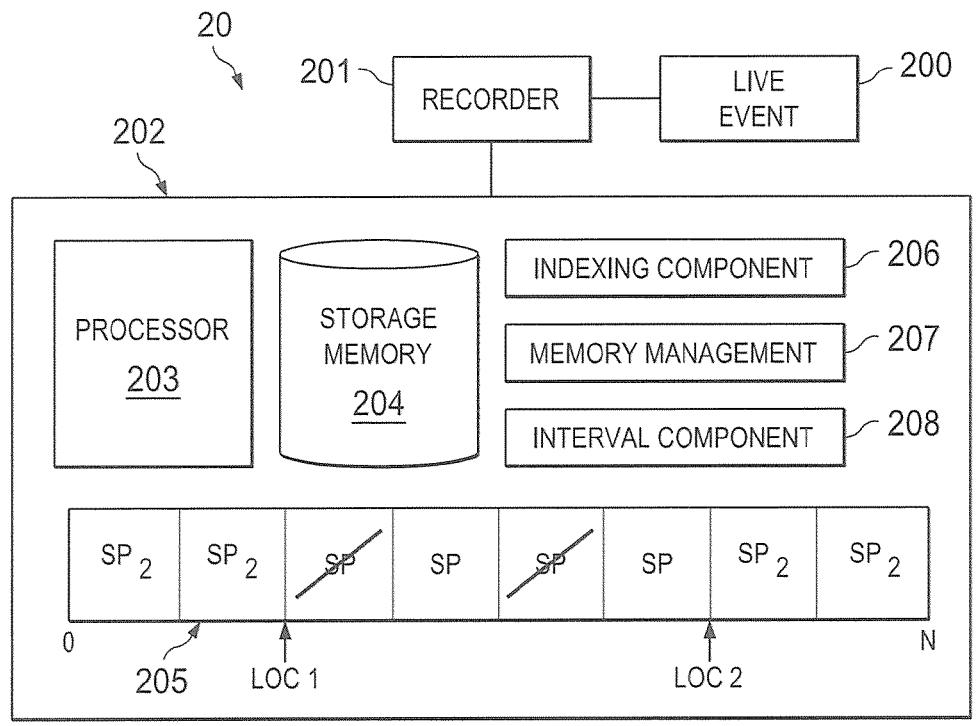

When the appropriate number of seek points have been deleted, as shown in FIG. 2D, the first two seek points are now spaced apart at the new interval, SP2. A location point or indicator, LOC1, is placed at the first position in index memory 205 to indicate the final seek point in the first portion of index memory 205 in which the seek points are spaced out at the original interval which has been modified now by the deleting. A second location point or indicator, LOC2, is placed at a second position corresponding to the final seek point entry of the seek points that are separated at the original first interval. For each new seek point recorded by indexing component 206 after LOC2, the new interval is used, as illustrated in FIG. 2E. FIG. 2E shows that index memory 205 has again been filled to capacity with SP2 points after LOC2. When this predefined capacity has again been reached, indexing system 20 prompts memory management component 207 to go back to the position of LOC2 and deletes alternate seek points from index memory 205, as illustrated in FIG. 2F. Again, the alternate seek points are deleted until 25% of the capacity of index memory 205 have been deleted.

Figure 2G:
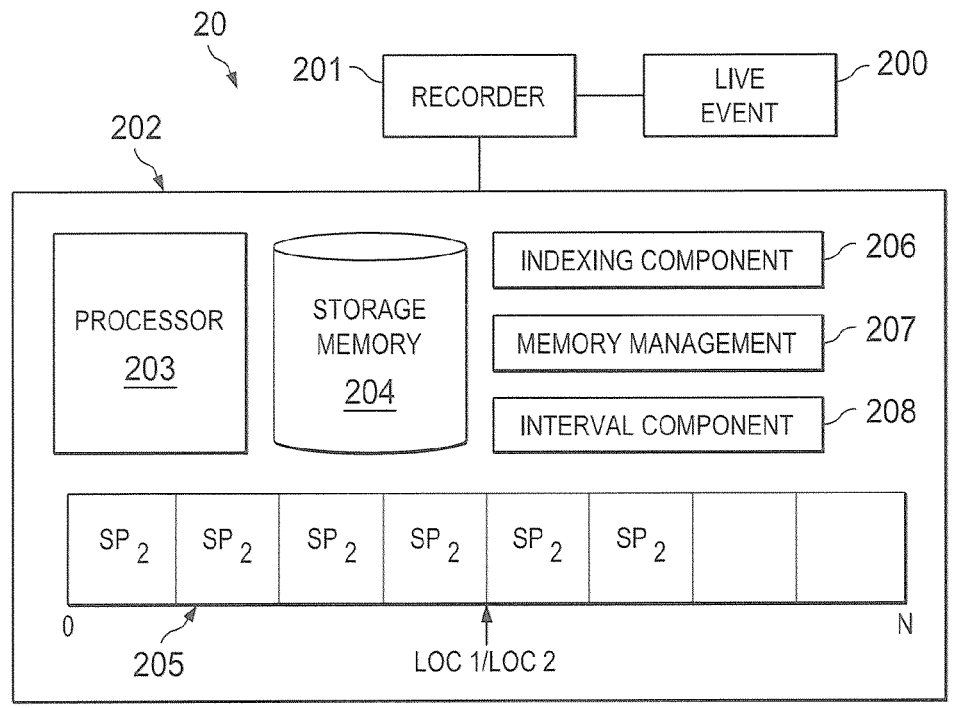

As illustrated in FIG. 2G, all of the originally recorded seek points, which were originally recorded at the first interval, now are separated at the second interval, because of the alternating deletions. Thus, LOC1, which marked the point within the originally recorded seek point where the second interval was present, and LOC2, which marked the end of the originally recorded seek points at the first interval, now coincide at the same point and can be dropped by indexing system 20.

Figure 2H:
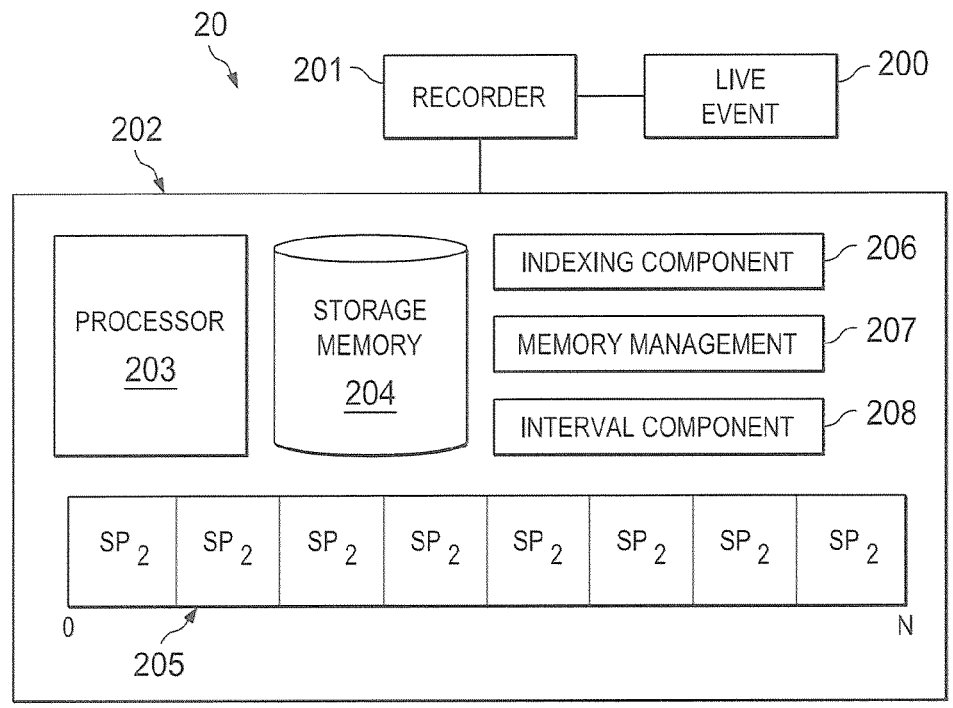
Figure 2I:
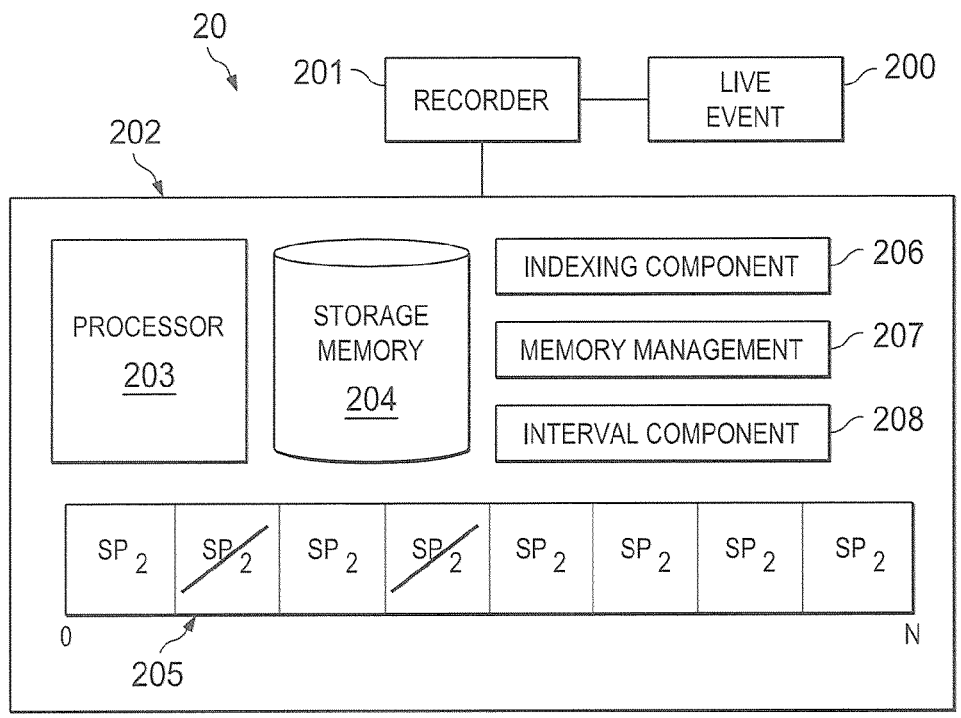
Figure 2J:
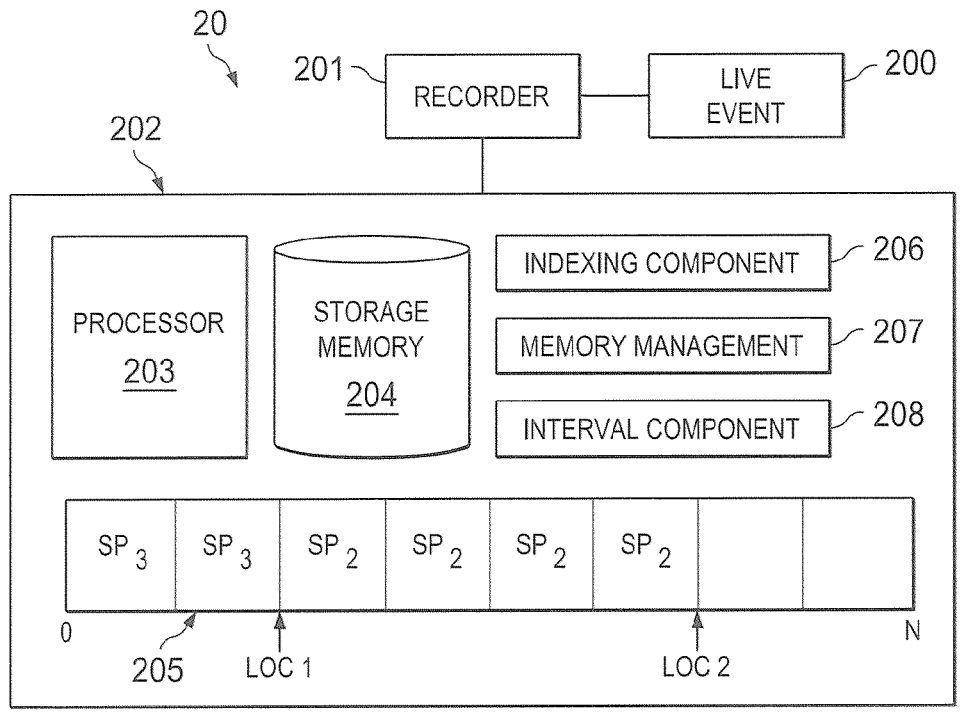

FIG. 2H illustrates index memory 205 again being filled to capacity with seek points at the second interval. Because index memory 205 is completely filled with seek points at the same interval, memory management component 207 starts the procedure again by returning to the beginning of index memory 205 to delete alternate seek points up to 25% of the total capacity of index memory 205, as illustrated in FIG. 2I. Indexing system 20 also prompts interval component 208 to calculate a new interval using formula (I). After these deletions, the first two seek point entries in index memory 205 are now separated at this new, third interval. Location indicator, LOC1, is again added at the point in index memory 205 representing the point of the previously recorded seek points that are now at the third interval, while LOC2 is again added at the end of those previously recorded seek points. This dynamic process of resizing the seek point interval to accommodate both the current length of the multimedia data being recorded and the predetermined capacity of index memory 205 continues until live even 200 eventually ends. When live event 200 eventually ends, the number of seek points entered into index memory 205 will be less than or equal to the maximum size of index memory 205.

It should be noted once again that the size limit of index memory 205 is selected to provide an acceptable number of seek points for any given multimedia file length. In this manner indexing system 20 maintains a predetermined capacity for index memory 205 while varying the seek point interval, which creates a more predictable memory overhead.

Figure 3:
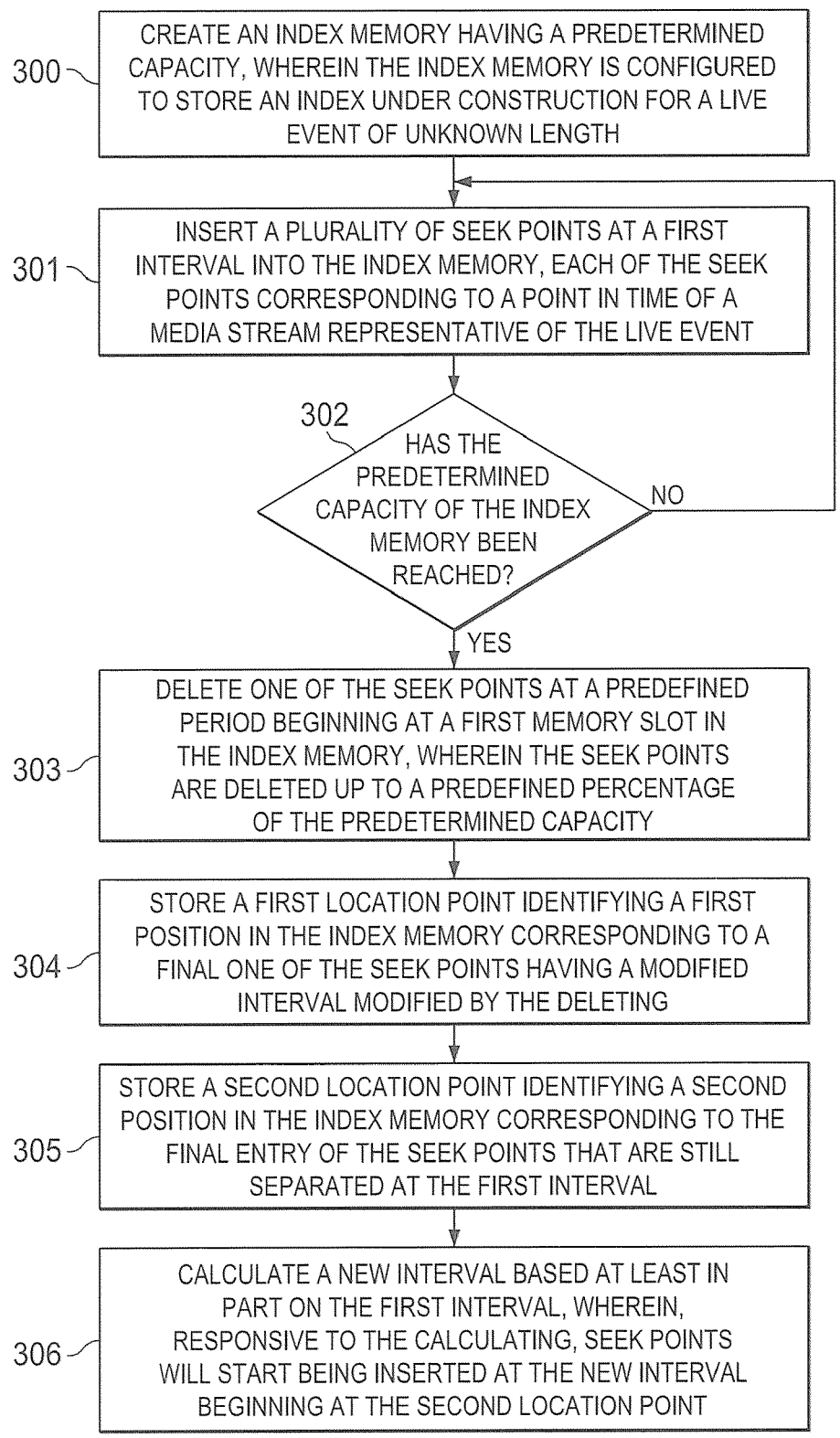
FIG. 3 is a flowchart illustrating example steps executed to implement one embodiment of the teachings herein.

FIG. 3 is a flowchart illustrating example steps executed to implement one embodiment of the teachings herein. In step 300, an index memory is created having a predetermined capacity, wherein the index memory is configured to store an index under construction for a live event of unknown length.

A plurality of seek points is inserted at a first interval into the index memory in step 301, where each of the seek points correspond to a point in time of a media stream representative of the live event. In step 302, a determination is made whether the predetermined capacity of the index memory been reached. If not, seek points will continue to be inserted in step 301. If the predetermined capacity has been reached, some of the seek points are deleted at a predefined period, in step 303, beginning at a first memory slot in the index memory, wherein the seek points are deleted up to a predefined percentage of the predetermined capacity. In step 304, a first location point is stored identifying a first position in the index memory corresponding to a final one of the seek points having a modified interval modified by the deleting. A second location point is stored, in step 305, identifying a second position in the index memory corresponding to the final entry of the seek points that are still separated at the first interval. In step 306, a new interval is calculated based at least in part on the first interval, wherein, responsive to the calculating, seek points will start being inserted at the new interval beginning at the second location point.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

FIG. 4 illustrates an exemplary computer system 400 which may be employed to implement index generation for recording live streaming according to certain embodiments of the teachings disclosed herein. Central processing unit (CPU) 401 is coupled to system bus 402. CPU 401 may be any general-purpose CPU. The present disclosure is not restricted by the architecture of CPU 401 (or other components of exemplary system 400) as long as CPU 401 (and other components of system 400) supports the inventive operations as described herein. CPU 401 may execute the various binary digital electronic signals representing logical instructions described herein. For example, CPU 401 may execute machine-level instructions according to the exemplary operational flow described above in conjunction with FIG. 3. When executing instructions representative of the operational steps illustrated in FIG. 3, CPU 501 becomes a special-purpose processor of a special purpose computing platform configured specifically to operate according to the various embodiments of the teachings described herein.

Computer system 400 also includes random access memory (RAM) 403, which may be SRAM, DRAM, SDRAM, or the like. Computer system 400 includes read-only memory (ROM) 404 which may be PROM, EPROM, EEPROM, or the like. RAM 403 and ROM 404 hold user and system data and programs, as is well known in the art.

Computer system 400 also includes input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information.

I/O adapter 405 connects to storage device(s) 406, such as one or more of hard drive, compact disc (CD) drive, floppy disk drive, tape drive, etc., to computer system 400. Communications adapter 411 is adapted to couple computer system 400 to network 412, which may enable information to be input to and/or output from system 400 via such network 412 (e.g., the Internet or other wide-area network, a local-area network, a public or private switched telephony network, a wireless network, any combination of the foregoing). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410. Display adapter 409 transmits instructions for transforming or manipulating the state of the various numbers of pixels used by display device 410 to visually present the desired information to a user. Such instructions include instructions for changing state from on to off, setting a particular color, intensity, duration, or the like. Each such instruction makes up the rendering instructions that control how and what is displayed on display device 410.

It shall be appreciated that the present disclosure is not limited to the architecture of system 400. For example, any suitable processor-based device may be utilized for implementing the index generating disclosed herein, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present teaching and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A method comprising:

creating an index memory having a predetermined capacity, wherein said index memory is configured to store an index under construction for a live event of unknown length;

inserting a plurality of seek points into said index memory, each of said plurality of seek points corresponding to a point in time of a media stream representative of said live event, wherein said plurality of seek points are inserted at a first interval;

responsive to said predetermined capacity of said index memory being reached:

deleting ones of said plurality of seek points at a predefined period beginning at a first memory slot in said index memory, wherein said ones are deleted up to a predefined percentage of said predetermined capacity;

storing a first location point identifying a first position in said index memory corresponding to a final seek point of said plurality of seek points having a modified interval modified by said deleting; and storing a second location point identifying a second position in said index memory corresponding to a final seek point entry of said plurality of seek points still having said first interval;

calculating a new interval based at least in part on said first interval;

inserting, responsive to said calculating, said plurality of seek points at said new interval beginning at said second location point; and responsive to said predetermined capacity being reached again using said new interval:

deleting additional ones of said plurality of seek points at said predefined period in said index memory beginning at said first location point, wherein said additional ones are deleted up to said predefined percentage, and responsive to said deleting the additional ones, inserting said plurality of seek points into said index memory at said new interval beginning at a first free memory slot in said index memory.

2. The method of claim 1 wherein said calculating said new interval comprises:

calculating said new interval such that a minimum percentage of granularity is maintained for a next length of said media stream required for re-filling said index memory to said predetermined capacity.

3. The method of claim 2 wherein said predefined percentage is predefined to delete a number of said ones of said plurality of seek points equivalent to an additional time of said media stream needed to arrive at said next length.

4. The method of claim 1 further comprising:

responsive to said deleting said additional ones, removing said first and second location points.

5. The method of claim 1 further comprising:

responsive to said predetermined capacity being reached again using said new interval:

deleting further ones of said plurality of seek points at said predefined period in said index memory beginning at said first memory slot, wherein said further ones are deleted up to said predefined percentage;

storing a third location point identifying a third position in said index memory corresponding to a last seek point of said plurality of seek points having an adjusted interval adjusted by said deleting; and storing a fourth location point identifying a fourth position in said index memory corresponding to a final seek point entry of said plurality of seek points still having said new interval;

calculating an additional new interval based at least in part on said new interval; and inserting, responsive to said calculating the additional new interval, said plurality of seek points at said additional new interval beginning at said fourth position.

6. The method of claim 1 wherein said predefined period comprises every other one of said plurality of inserted seek points.

7. A system comprising:

memory coupled to a processor;

an indexing application stored in said memory, wherein, when executed by said processor, said indexing application comprises:

an indexing component configured to add a plurality of seek points at a first interval to a predefined length index memory wherein each of said plurality of seek points corresponds to a time point of a live media stream of unknown length;

a memory management component configured to monitor a current capacity of said predefined length index memory and further configured to:

delete, when said predefined length index memory is full, a portion of said plurality of seek points from a beginning of said predefined length index memory up to a fixed percentage of a total capacity of said predefined length index memory;

store a first location identifying an ending point of said plurality of seek points that have a modified interval length modified by said deleted portion; and store a second location identifying a last entry in said predefined length index memory still having said first interval; and an interval component configured to calculate a new interval based at least in part on said first interval, wherein said indexing component is further configured to continue adding said plurality of seek points to said predefined length index memory at said new interval, wherein said memory management component is further configured to delete, up to said fixed percentage, another portion of said plurality of seek points beginning at said first location when said predefined length index memory is full again, and wherein said indexing component is further configured to continue adding said plurality of seek points at said new interval beginning at a first available location in said predefined length index memory.

8. The system of claim 7 further comprising:

a media interface configured to receive said live media stream from an event recorder.

9. The system of claim 7 wherein said interval component is further configured to maintain a minimum percentage of granularity for a next length of said live media stream that will fill said predefined length index memory.

10. The system of claim 9 wherein said fixed percentage is predefined to delete one or more seek points of said portion equivalent to an additional time of said live media stream needed to arrive at said next length.

11. The system of claim 7 wherein said memory management component is further configured:
to delete, when said predefined length index memory is full again, a further portion of said plurality of seek points from said beginning up to said fixed percentage;
to store a third location identifying an end location of said plurality of seek points having an altered interval length modified by said deleted further portion; and
to store a fourth location identifying a last location of said plurality of seek points still having said new interval.

12. The system of claim 11 wherein, responsive to said deletion, said interval component is further configured to calculate an additional new interval based at least in point on said new interval.

13. The system of claim 12 wherein said indexing component is further configured to continue adding said plurality of seek points at said additional new interval beginning at said fourth location in said predefined length index memory.

14. The system of claim 7 wherein said portion comprises alternate ones of said plurality of seek points stored in said predefined length index memory.

15. A computer program product having a non-transitory computer readable medium with computer program logic stored thereon, said computer program product comprising:
code for creating an index memory having a predetermined capacity, wherein said index memory is configured to store an index under construction for a live event of unknown length;
code for inserting a plurality of seek points into said index memory, each of said plurality of seek points corresponding to a point in time of a media stream representative of said live event, wherein said plurality of seek points are inserted at a first interval;
code, executable responsive to said predetermined capacity of said index memory being reached, for:
deleting ones of said plurality of seek points at a predefined period beginning at a first memory slot in said index memory, wherein said ones are deleted up to a predefined percentage of said predetermined capacity;
storing a first location point identifying a first position in said index memory corresponding to a final seek point of said plurality seek points having a modified interval modified by results of execution of said code for deleting; and
storing a second location point identifying a second position in said index memory corresponding to a final seek point entry of said plurality of seek points still having said first interval;
code for calculating a new interval based at least in part on said first interval,
wherein, responsive to execution of said code for calculating, said code for inserting said plurality of seek points begins inserting again at said new interval beginning at said second location point;
code, executable responsive to said predetermined capacity being reached again using said new interval, for deleting additional ones of said plurality of seek points in said index memory beginning at said first location point, wherein said additional ones are deleted up to said predefined percentage; and
code for continuing execution of said code for inserting, wherein said continued insertion uses said new interval beginning at a first free space in said index memory.

16. The computer program product of claim 15 wherein said code for calculating said new interval comprises:
code for calculating said new interval such that a minimum percentage of granularity is maintained for a next length of said media stream required for re-filling said index memory to said predetermined capacity.

17. The computer program product of claim 16 wherein said predefined percentage is predefined to delete a number of said ones of said seek points equivalent to an additional time of said media stream needed to arrive at said next length.

18. The computer program product of claim 15 further comprising:
code, executable responsive to said code for deleting, for removing said first and second location points.

19. The computer program product of claim 15 further comprising:
executing, responsive to said predetermined capacity being reached again using said new interval:
code for deleting further ones of said plurality of seek points at said first interval in said index memory beginning at said first position, wherein said further ones are deleted up to said predefined percentage;
code for storing a third location point identifying a third position in said index memory corresponding to a last seek point of said plurality of seek points having an adjusted interval adjusted by results of said code for deleting; and
code for storing a fourth location point identifying a fourth position in said index memory corresponding to a final seek point entry of said plurality of seek points still having said new interval; and
code for calculating an additional new interval based at least in part on said new interval, wherein, responsive to results of said code for calculating, said plurality of seek points are inserted at said additional new interval beginning at said fourth position.

20. The computer program product of claim 15 wherein said predefined period comprises alternate seek points in said plurality of seek points.

21. A method comprising:
receiving a binary digital electronic signal representing a media stream recording a live event of unknown length;
executing instructions on a computing platform so that binary digital electronic storage signals create an index memory having a predetermined capacity, wherein said index memory is configured to store an index under construction for said media stream;
executing instructions on said computing platform so that a plurality of seek points are inserted into said index memory, each of said plurality of seek points corresponding to a point in time of said media stream, wherein said plurality of seek points are inserted at a first interval;
responsive to said predetermined capacity of said index memory being reached:
executing instructions on said computing platform so that ones of said plurality of seek points are deleted at a predefined period beginning at a first memory slot in said index memory, wherein said ones are deleted up to a predefined percentage of said predetermined capacity;
executing instructions on said computing platform so that a first location point is stored identifying a first position in said index memory corresponding to a final seek point of said plurality of seek points having a modified interval modified by said deletion; and executing instructions on said computing platform so that a second location point is stored identifying a second position in said index memory corresponding to a final seek point of said plurality of seek points still having said first interval;

executing instructions on said computing platform so that a new interval based at least in part on said first interval is calculated, wherein, responsive to said calculation, said plurality of seek points are then inserted at said new interval beginning at said second location point; and responsive to said predetermined capacity being reached again using said new interval:

executing instructions on said computing platform so that additional ones of said plurality of seek points are deleted at said predefined period in said index memory beginning at said first location point, wherein said additional ones are deleted up to said predefined percentage, and responsive to said deleting the additional ones, executing instructions on said computing platform so that said plurality of seek points into are inserted into said index memory at said new interval beginning at a first free memory slot in said index memory.

22. The method of claim 21 wherein said new interval is calculated at least in part by:

executing instructions on said computing platform so that said new interval is calculated such that a minimum percentage of granularity is maintained for a next length of said media stream required for re-filling said index memory to said predetermined capacity.

23. The method of claim 22 wherein said predefined percentage is predefined to delete a number of said ones of said seek points equivalent to an additional time of said media stream needed to arrive at said next length.

24. The method of claim 21 further comprising:

responsive to deletion of the ones of said plurality of seek points, executing instructions on said computing platform so that said first and second location points are removed.

25. The method of claim 21 further comprising:

responsive to said predetermined capacity being reached again using said new interval:

executing instructions on said computing platform so that further ones of said plurality of seek points are deleted at said first interval in said index memory beginning at said first position, wherein said further ones are deleted up to said predefined percentage;

executing instructions on said computing platform so that a third location point identifying a third position is stored in said index memory corresponding to a last seek point of said plurality of seek points having an adjusted interval adjusted by deletion of the further ones; and executing instructions on said computing platform so that a fourth location point identifying a fourth position is stored in said index memory corresponding to a final seek point entry of said plurality of seek points still having said new interval; and executing instructions on said computing platform so that an additional new interval is calculated based at least in part on said new interval, wherein, responsive to results of said calculation, said plurality of seek points are inserted at said additional new interval beginning at said fourth position.

26. The method of claim 21 wherein said predefined period comprises alternate seek points in said plurality of seek points.

* * * * *

UNITED STATES PATENT AND TRADEMARK OFFICE
CERTIFICATE OF CORRECTION

PATENT NO. : 8,325,795 B1
APPLICATION NO. : 12/325969
DATED : December 4, 2012
INVENTOR(S) : Neeraj Goel et al.

Page 1 of 1

It is certified that error appears in the above-identified patent and that said Letters Patent is hereby corrected as shown below:

Column 11, line 13, delete "point" and insert -- part -- therefor.

Signed and Sealed this
Twelfth Day of March, 2013

Teresa Stanek Rea
*Acting Director of the United States Patent and Trademark Office*